(12) United States Patent
Yang et al.

(10) Patent No.: US 12,430,058 B2
(45) Date of Patent: Sep. 30, 2025

(54) DATA COPYING USING A SOURCE GROUP AND A TARGET GROUP OF DATA STORAGE SYSTEMS

(71) Applicant: Dell Products L.P., Round Rock, TX (US)

(72) Inventors: Zhe Yang, Chengdu (CN); Rui Chen, Chengdu (CN); Hua Wang, Chengdu (CN); Xingguo Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 17/992,542

(22) Filed: Nov. 22, 2022

(65) Prior Publication Data

US 2023/0342061 A1 Oct. 26, 2023

(30) Foreign Application Priority Data

Apr. 21, 2022 (CN) .......................... 202210423227.1

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC ..... G06F 3/0647; G06F 3/0604; G06F 3/0679
See application file for complete search history.

(56) References Cited

U.S. PATENT DOCUMENTS

| | | | |
|---|---|---|---|
| 11,442,958 B2 | 9/2022 | Savir et al. | |
| 11,513,910 B2 | 11/2022 | Natanzon et al. | |
| 11,537,553 B2 | 12/2022 | Aldred et al. | |
| 11,579,800 B2 | 2/2023 | Danilov et al. | |
| 11,593,497 B2 | 2/2023 | Chopra et al. | |
| 2005/0080810 A1* | 4/2005 | Matsuura | G06F 3/0605 707/999.102 |
| 2007/0050574 A1* | 3/2007 | Kaiya | G06F 11/2058 711/162 |
| 2007/0118710 A1* | 5/2007 | Yamakawa | G06F 3/061 711/165 |
| 2007/0136548 A1* | 6/2007 | Mane | G06F 16/128 711/170 |
| 2007/0186067 A1* | 8/2007 | Nagata | G06F 11/2069 711/162 |
| 2010/0257412 A1* | 10/2010 | Acuna | G06F 11/0727 714/E11.03 |
| 2012/0096059 A1* | 4/2012 | Shimizu | G06F 3/0689 707/828 |
| 2014/0372639 A1* | 12/2014 | Li-On | G06F 3/0647 710/74 |
| 2019/0208005 A1* | 7/2019 | Gadalin | H04L 67/60 |
| 2022/0197559 A1* | 6/2022 | Chen | G06F 3/067 |

* cited by examiner

*Primary Examiner* — Eric T Loonan

(74) *Attorney, Agent, or Firm* — BainwoodHuang

(57) ABSTRACT

Techniques for data processing involve creating a source group including a first storage system and a target group including a plurality of storage systems. Such techniques further involve selecting a second storage system from the plurality of storage systems in the target group based on the performance of the plurality of storage systems in the target group. Such techniques further involve copying data in the first storage system to the second storage system. Accordingly, automatic data migration can be achieved, thus improving the security of data and the availability of storage systems.

11 Claims, 9 Drawing Sheets

DATA COPYING USING A SOURCE GROUP AND A TARGET GROUP OF DATA STORAGE SYSTEMS

CROSS-REFERENCE TO RELATED APPLICATION

This application claims priority to Chinese Patent Application No. CN202210423227.1, on file at the China National Intellectual Property Administration (CNIPA), having a filing date of Apr. 21, 2022 and having "METHOD, ELECTRONIC DEVICE AND COMPUTER PROGRAM PRODUCT FOR DATA PROCESSING" as a title, the contents and teachings of which are herein incorporated by reference in their entirety.

TECHNICAL FIELD

Embodiments of the present disclosure relate to the field of computers, and more particularly, to a method, an electronic device, and a computer program product for data processing.

BACKGROUND

With the development of technology, some data management applications not only may manage user data, but also may store these data in different ways (redundant storage and remote storage) to increase security. When faced with migration of a large amount of data, it is often encountered that insufficient I/O performance or storage capacity results in data loss, data migration failures, sudden failures, and so on.

SUMMARY OF THE INVENTION

Embodiments of the present disclosure provide a method, an electronic device, and a computer program product for data processing.

According to a first aspect of the present disclosure, a method for data processing is provided. The method includes creating a source group including a first storage system and a target group including a plurality of storage systems. The method also includes selecting a second storage system from the plurality of storage systems in the target group based on the performance of the plurality of storage systems in the target group. The method further includes copying data in the first storage system to the second storage system.

According to a second aspect of the present disclosure, an electronic device is also provided. The electronic device includes a processor and a memory coupled to the processor. The memory has instructions stored therein which, when executed by the processor, cause the device to perform actions. The actions include creating a source group including a first storage system and a target group including a plurality of storage systems. The actions also include selecting a second storage system from the plurality of storage systems in the target group based on the performance of the plurality of storage systems in the target group. The actions further include copying data in the first storage system to the second storage system.

According to a third aspect of the present disclosure, a computer program product is provided. The computer program product is tangibly stored on a computer-readable medium and includes computer-executable instructions that, when executed by a device, cause the device to perform the method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar drawing marks represent identical or similar elements, in which.

In all the accompanying drawings, identical or similar reference numerals indicate identical or similar elements.

DETAILED DESCRIPTION

Figure 1:
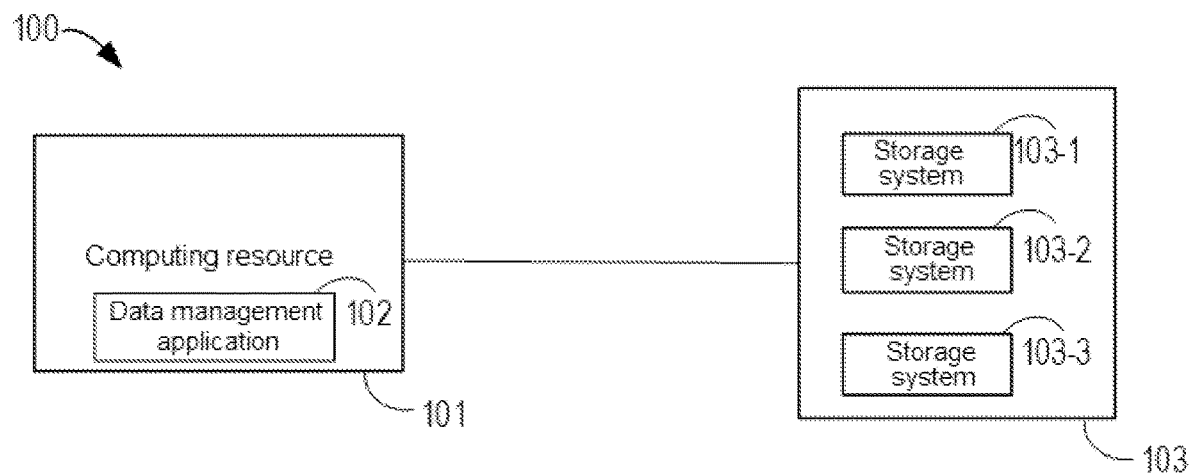
FIG. 1 shows a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

The inventors have noticed that, when migrating data, existing data management applications often encounter data loss due to insufficient I/O performance or storage capacity, data migration failures, and sudden failures. This brings bad user experience to users. Meanwhile, existing data management applications cannot copy data from one storage system to a plurality of storage systems in a "one-to-many" manner, which brings disadvantages such as low efficiency and low security to both data backup and data migration.

In view of this, the method of the present disclosure provides a method for data processing. The method may select a storage system with better performance among a plurality of storage systems and copy data to the selected storage system. When it is detected that the performance of the storage system declines, data can also be migrated in time to ensure the security of data.

FIG. 1 shows a schematic diagram of example environment 100 in which embodiments of the present disclosure can be implemented.

In environment 100, computing resource 101 (e.g., a computing system or a server) has data management application 102 installed thereon. Through a network, data managed on data management application 102 may be stored in a plurality of storage systems 103-1, 103-2, 103-N (individually or collectively referred to as storage system 103), and these storage systems 103 may be distributed in any geographic location. Storage system 103 may include a plurality of storage devices (e.g., disks) and corresponding software.

Figure 2A:
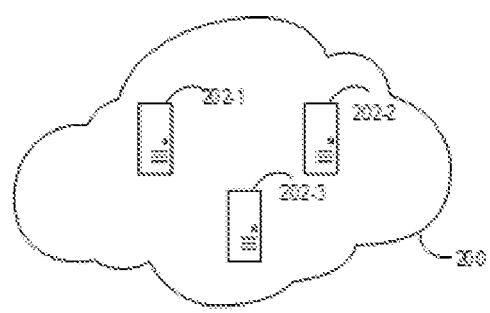
FIG. 2A schematically shows a schematic diagram of a source group according to an example implementation of the present disclosure.

FIG. 2A schematically shows a schematic diagram of source group 200 according to an example implementation of the present disclosure.

As shown in FIG. 2A, source group 200 may include a plurality of storage systems 202 (e.g., storage system 202-1, storage system 202-2, and storage system 202-3, or collectively referred to as storage system 202). The plurality of storage systems 202 are virtually (logically) grouped into a whole and referred to as source group 200. User data is stored in one or more storage systems in the source group. When creating source group 200, the storage systems in the source group need to be configured according to parameters including a first virtual pool, a first virtual address, and a first virtual file system, which will be described in detail below.

Figure 2B:
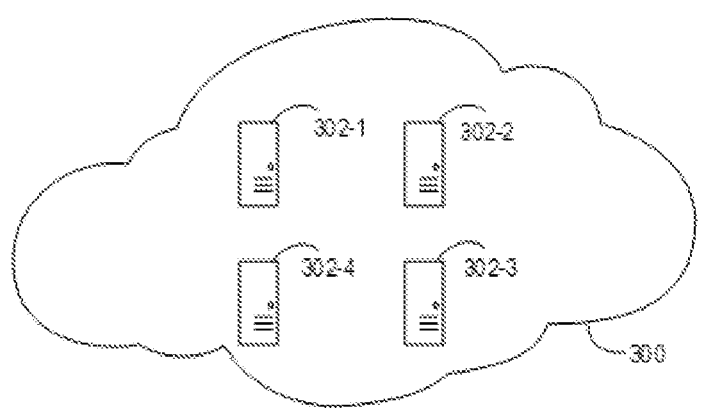
FIG. 2B schematically shows a schematic diagram of a target group according to an example implementation of the present disclosure.

FIG. 2B schematically shows a schematic diagram of target group 300 according to an example implementation of the present disclosure.

As shown in FIG. 2B, target group 300 may include a plurality of storage systems 302 (e.g., storage system 302-1, storage system 302-2, storage system 302-3, and storage system 302-4, or collectively referred to as storage system 302). The plurality of storage systems 302 are virtually (logically) grouped into a whole and referred to as target group 300. User data is to be copied from the source group to one or more storage systems of target group 300. When creating target group 300, the storage systems in the target group need to be configured according to parameters including a second virtual pool and a second virtual address, which will be described in detail below.

Figure 3:
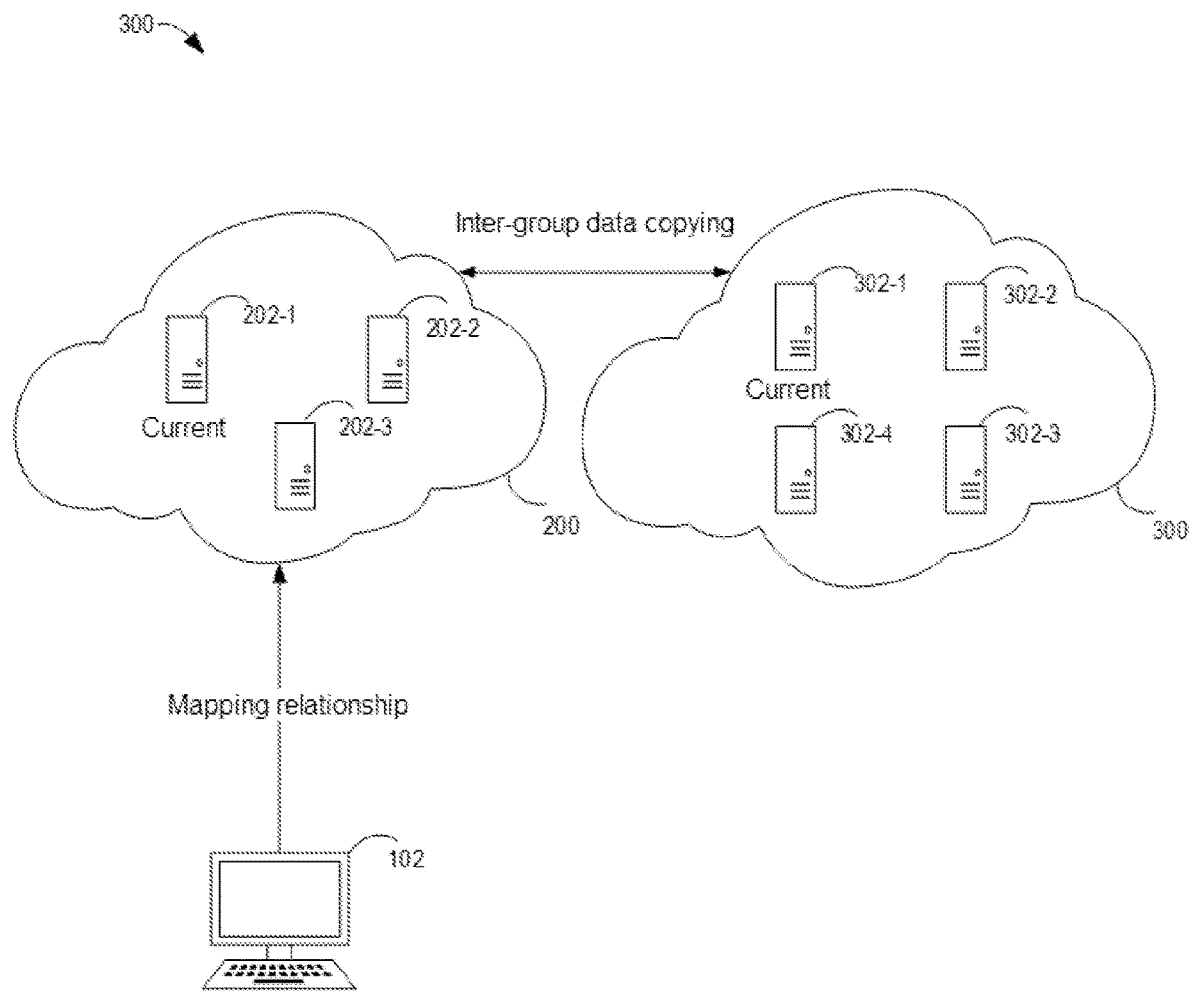
FIG. 3 schematically shows a schematic diagram of data copying between a source group and a target group according to an example implementation of the present disclosure.

FIG. 3 schematically shows a schematic diagram of data copying between a source group and a target group according to an example implementation of the present disclosure.

As shown in FIG. 3, a user may create source group 200 and target group 300 by using a mapping relationship via data management application 102 and implement data copying between the source group and the target group. The specific implementation process will be discussed in conjunction with FIG. 4 to FIG. 7B.

Figure 4:
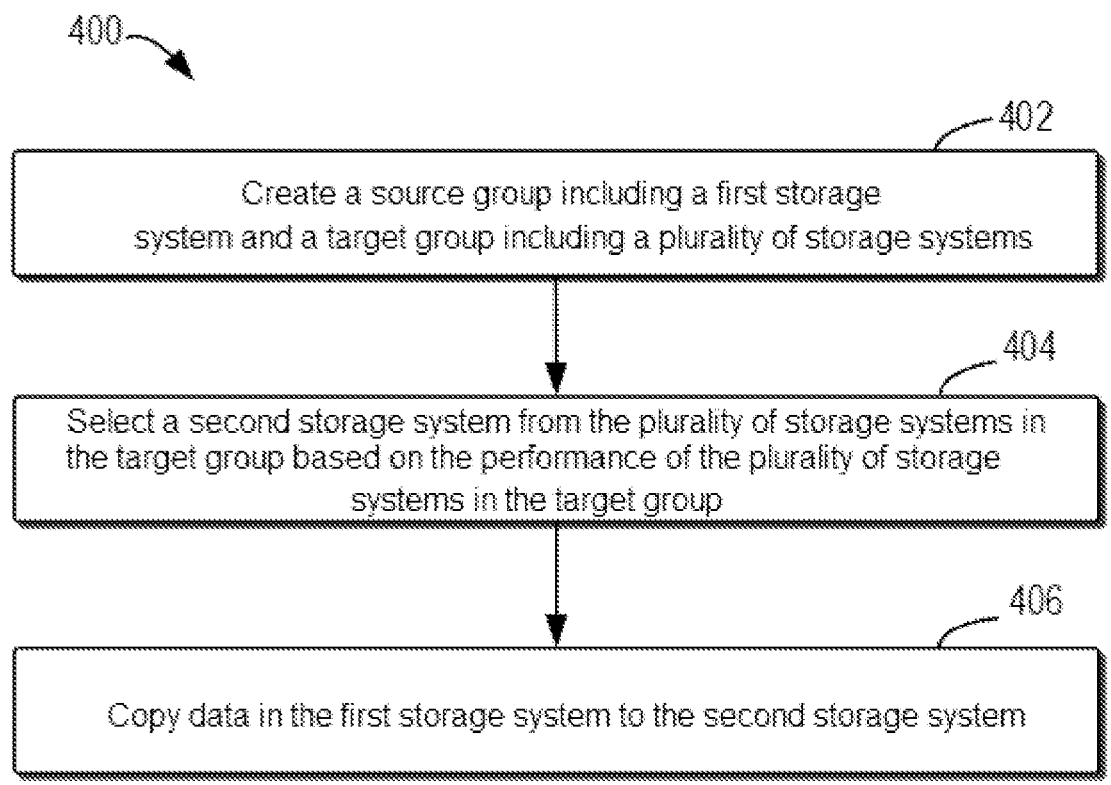
FIG. 4 schematically shows a flow chart of a method for data processing according to an example implementation of the present disclosure.

FIG. 4 schematically shows a flow chart of method 400 for data processing according to an example implementation of the present disclosure.

At block 402, a source group including a first storage system and a target group including a plurality of storage systems are created.

The creation is a logical virtual creation. It needs to be completed by creating a virtual pool, a virtual address, and a virtual file address. The specific process will be described below. By creating a source group and a target group, two different virtual systems may be divided. Each virtual system will include a plurality of storage systems. For the outside (e.g., a user), each of the two virtual systems is a whole, thereby providing usability to the user. The user does not need to distinguish specific storage systems and their various parameters. User data is stored in the first storage system in the source group.

In some embodiments, creating a source group including a first storage system and a target group including a plurality of storage systems includes creating a first mapping relationship between the first storage system and the source group.

Source group 200 and target group 300 may be logically formed as a whole and configured as a whole to respond to an external access. Therefore, it is necessary to use a mapping relationship to configure the source group and the target group so that they can associate corresponding storage systems. The mapping relationship may include parameters of appropriate virtual components (devices), which may include parameters associated with virtual pools, virtual addresses, and virtual file systems.

Taking source group 200 as an example, a source group may be logically created in a data management application, and storage systems included in the source group may be configured by using a first mapping relationship. Specifically, a first virtual pool may be utilized. The first virtual pool indicates which storage devices (e.g., disks, SSD, etc.) may be included. In some examples, a first virtual address may be established for a source group. A user or an external device may directly access the virtual address when accessing a storage device of a storage system in the source group without knowing an address of the particular storage system. Meanwhile, when creating a source group, a file system may be created. Data actually stored in storage systems may be managed by using the file system, i.e., a virtual file system provides an interactive interface between users and data. But for users, the file system does not need to have the users to divide which data are stored on which storage systems. Therefore, it is referred to as a virtual file system.

By means of the virtual pool, virtual address, and virtual file system, users can easily manage data without various complex configurations.

The same concept may also be used to create a target group, but the virtual file system does not need to be created again when creating the target group. In the following description, the process of creating the source group or target group will also be described in conjunction with FIG. 5.

At block 404, a second storage system is selected from the plurality of storage systems in the target group based on the performance of the plurality of storage systems in the target group.

As an example, the selection of the storage system may be based on a measure of extendibility, availability, stability, I/O performance (e.g., access rate), etc., of the storage system. By setting appropriate target performance and comparing differences between the performance of each of the plurality of storage systems and the target performance, a storage system with optimal performance is determined as the second storage system.

At block 406, data in the first storage system is copied to the second storage system.

Data on the first storage system in source group 200 may be copied to the selected second storage system via a network. But for a user, the user only knows that the data is copied from the source group to the target group. In this way, it is possible to automatically migrate data and improve the security of data and the availability of storage systems. Especially for a user, there is no need to select a particular storage system more times, so that it is user-friendly and easy to operate.

In some embodiments, in response to that the performance of the second storage system declines to not satisfy the target performance and based on the performance of other storage systems in the target group, a third storage system is selected from the other storage systems in the target group; and data in the first storage system is copied to the third storage system. As an example, assuming that the second storage system is storage system 302-1 in FIG. 3, a storage system with optimal performance (assumed to be storage system 302-3) is selected from storage system 302-2, storage system 302-3, and storage system 302-4 as the third storage system, and data is copied from storage system 302-1 to storage system 302-3.

In some embodiments, in response to that the performance of the second storage system declines to not satisfy the target performance, a notification of a failure of the second storage system is sent to a user after the data is copied from the first storage system to the third storage system. As an example, if it is detected that the data migration from storage system 302-1 to storage system 302-3 is completed, the user may be notified that storage system 302-1 may have a failure, thereby prompting the user to schedule subsequent maintenance work in time. Meanwhile, since the data has been migrated, the user does not need to worry about the security of the data. In the following description, how an intra-group data migration process is implemented will also be described in conjunction with FIG. 6A and FIG. 6B.

In some embodiments, in response to detecting a failure of the first storage system, differential data between data stored in the first storage system and in the second storage system is identified. The identified differential data is copied to the second storage system; and the second storage system is determined as a storage system in the source group. As an example, if a storage system in the source group fails, it is possible at this moment to compare data on the storage system of the source group with data on the corresponding storage system in the target group to determine differential data. These differences may be caused by the fact that the data of the source group has been changed but the changed data has not been backed up to the target group. At this moment, these differential data may be copied from the source group to the target group, and the storage system of the target group is set as a storage system in the source group. In this way, the security of the data can be ensured in time. How (inter-group) data migration between the source group and the target group is implemented will be described in detail later in conjunction with FIG. 7A and FIG. 7B.

Figure 5:
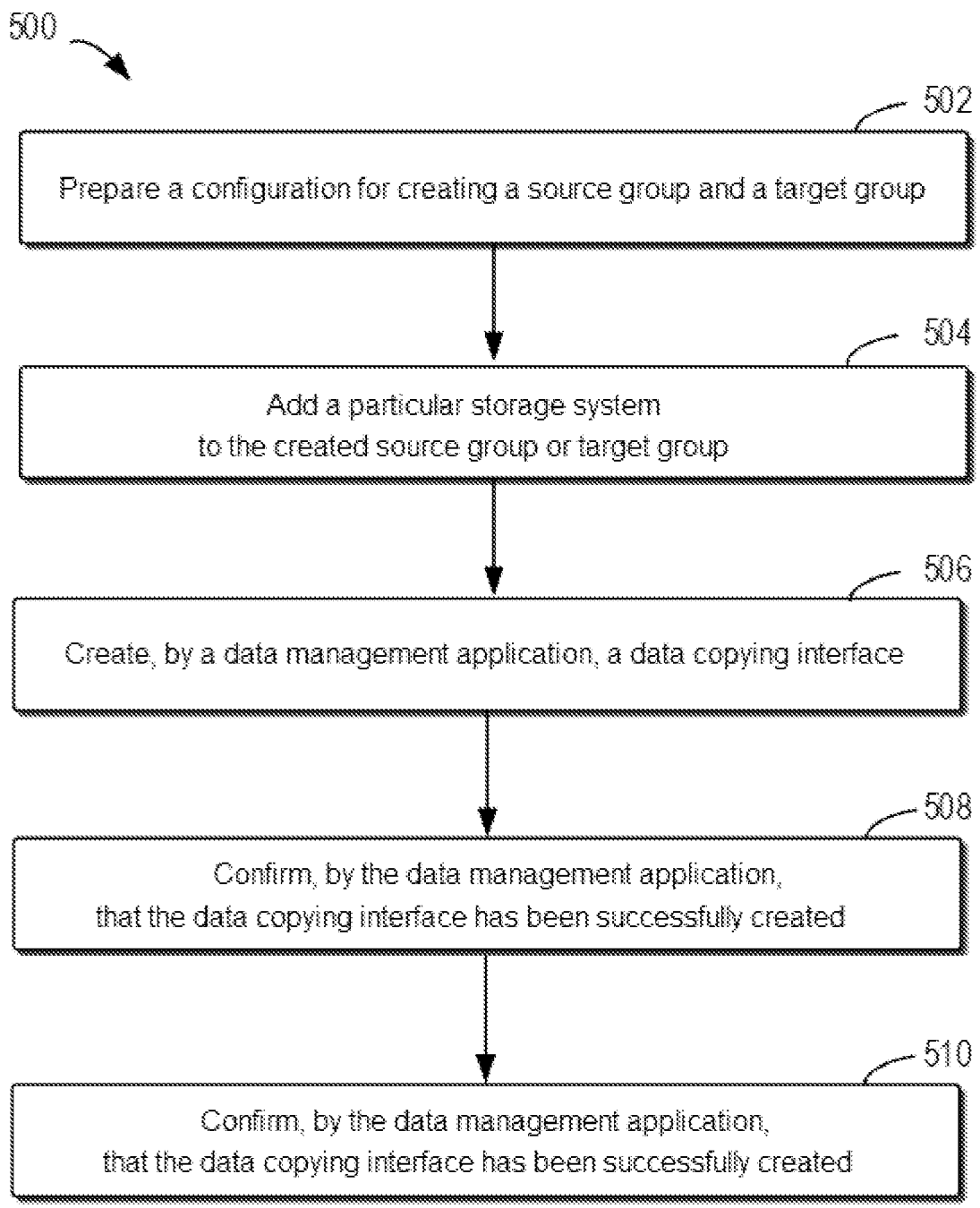
FIG. 5 schematically shows a schematic diagram of a workflow for creating a source group and a target group according to an example implementation of the present disclosure.

FIG. 5 schematically shows a schematic diagram of a workflow for creating a source group and a target group according to an example implementation of the present disclosure. A detailed process for creating a source group and a target group will be discussed below in conjunction with FIG. 5.

At block 502, a configuration is prepared for creating a source group and a target group. As an example, a configuration of IP addresses, subnets, and gateways is prepared by a user for creating source group 200 and target group 300.

At block 504, interfaces of the source group and the target group are created on a user management application.

At block 506, a particular storage system is added to the created source group or target group. An appropriate number of storage systems may be added to the source group or the target group as needed. Specifically, the configuration of IP addresses, subnets, and gateways prepared at block 502 may be provided to a data management application, and a storage system corresponding to the configuration may be marked by the data management application as a storage system in the source group or the target group.

At block 508, the data management application may create a data copying interface. Specifically, the data management application may identify a storage system with the best performance (or the lowest load) based on the I/O performance of the storage systems, send the configuration of IP addresses, subnets, and gateways to the identified storage system, and request creation of a data copying interface.

At block 510, the data management application confirms that the data copying interface has been successfully created. Specifically, a query request may be sent by the data management application to confirm whether the data copying interface has been successfully created. If the data copying interface has been successfully created, it may be confirmed by the data management application that the address of the storage system is reachable.

All or part of workflow 500 may be repeated to add a plurality of storage systems to the source group or the target group.

Figure 6A:
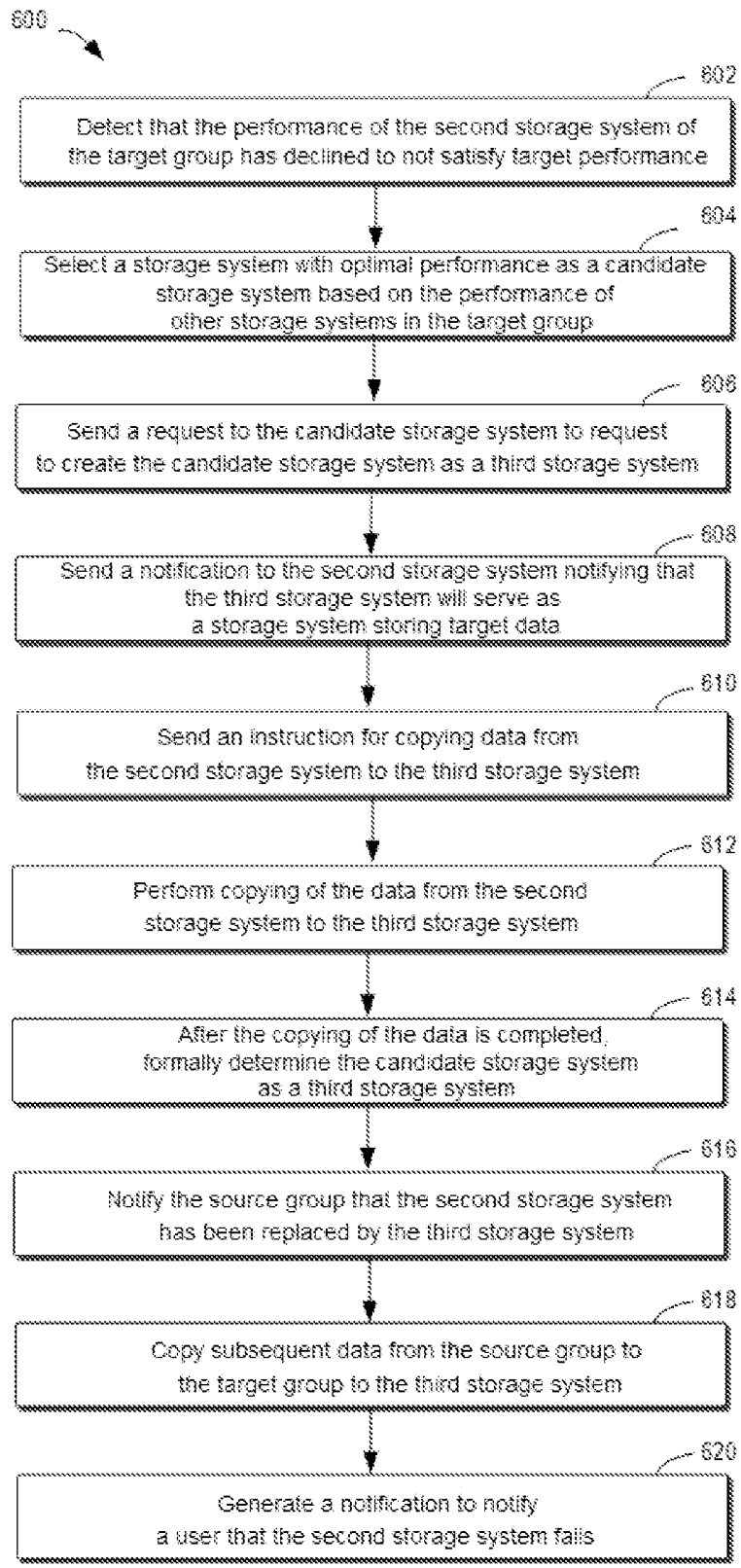
FIG. 6A schematically shows a schematic diagram of a workflow for intra-group copying according to an example implementation of the present disclosure.
Figure 6B:
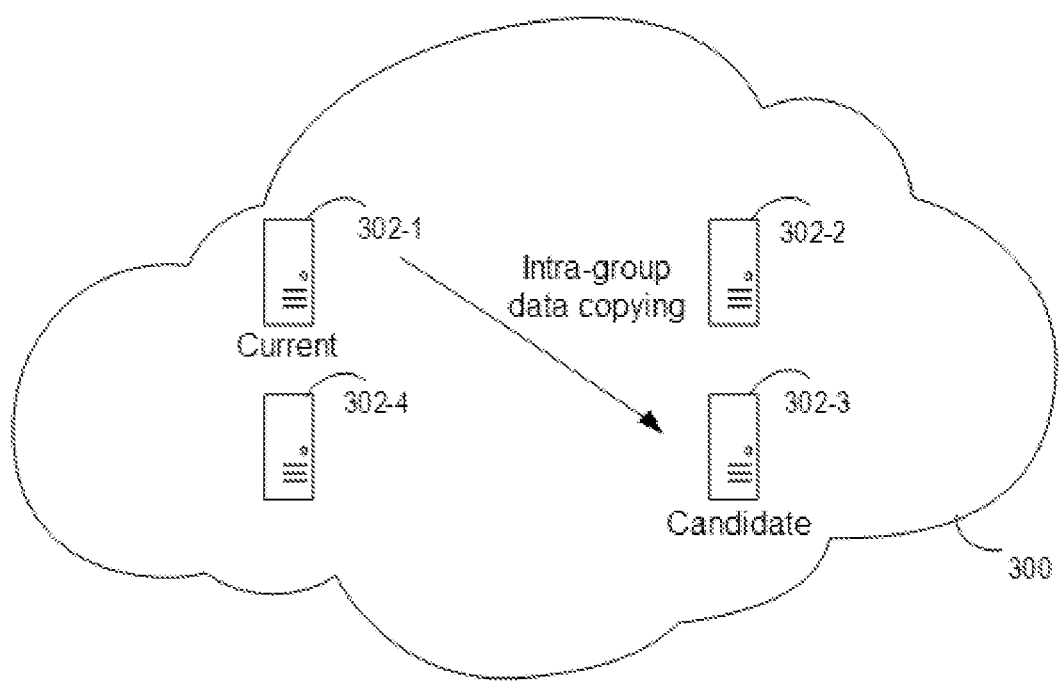
FIG. 6B schematically shows a block diagram of a device for intra-group copying according to an example implementation of the present disclosure.

FIG. 6A schematically shows a schematic diagram of workflow 600 for intra-group copying according to an example implementation of the present disclosure. FIG. 6B schematically shows a block diagram of a device for intra-group copying according to an example implementation of the present disclosure. How migration of data within a target group is implemented will be discussed in detail below in conjunction with FIG. 6A and FIG. 6B.

At block 602, it is detected by the data management application that the performance of the second storage system of the target group has declined to not satisfy target performance. As an example, it is detected at data management application 102 that the performance of storage system 302-1 has declined below the target performance (e.g., I/O access rate).

At block 604, a storage system with optimal performance is selected as a candidate storage system by the data management application based on the performance of other storage systems in the target group. As an example, a storage system with optimal performance (assumed to be storage system 302-3) is selected as a candidate storage system from storage system 302-2, storage system 302-3, and storage system 302-4.

At block 606, a request is sent by the data management application to the candidate storage system to request to create the candidate storage system as a third storage system. As an example, data management application 102 may send a request to storage system 302-3.

At block 608, the data management application sends a notification to the second storage system notifying that the third storage system will serve as a storage system storing target data. As an example, data management application 102 may send a notification to storage system 302-1.

At block 610, the data management application sends an instruction for copying data from the second storage system to the third storage system. Data management application 102 may execute an instruction for copying data from storage system 302-1 to storage system 302-3.

At block 612, copying of the data from the second storage system to the third storage system is performed.

At block 614, after the copying of the data is completed, the candidate storage system is formally determined as a third storage system. As an example, data management application 102 may formally determine storage system 302-3 as a third storage system.

At block 616, the data management application notifies the source group that the second storage system has been replaced by the third storage system. As an example, data management application 102 notifies source group 200 that storage system 302-3 has changed to a new second storage system.

At block 618, subsequent data from the source group to the target group will be copied to the third storage system. As an example, when subsequently migrating data, the data will be directly copied from source group 200 to storage system 302-3 (the new second storage system).

At block 620, a notification is generated by the data management application to notify a user that the second storage system fails.

In workflow 600, by setting the third storage system as a candidate storage system and formally replacing the second storage system with the third storage system after data copying is completed, seamless migration of data can be achieved, and users do not need any additional operations and will not perceive these migration processes.

Figure 7A:
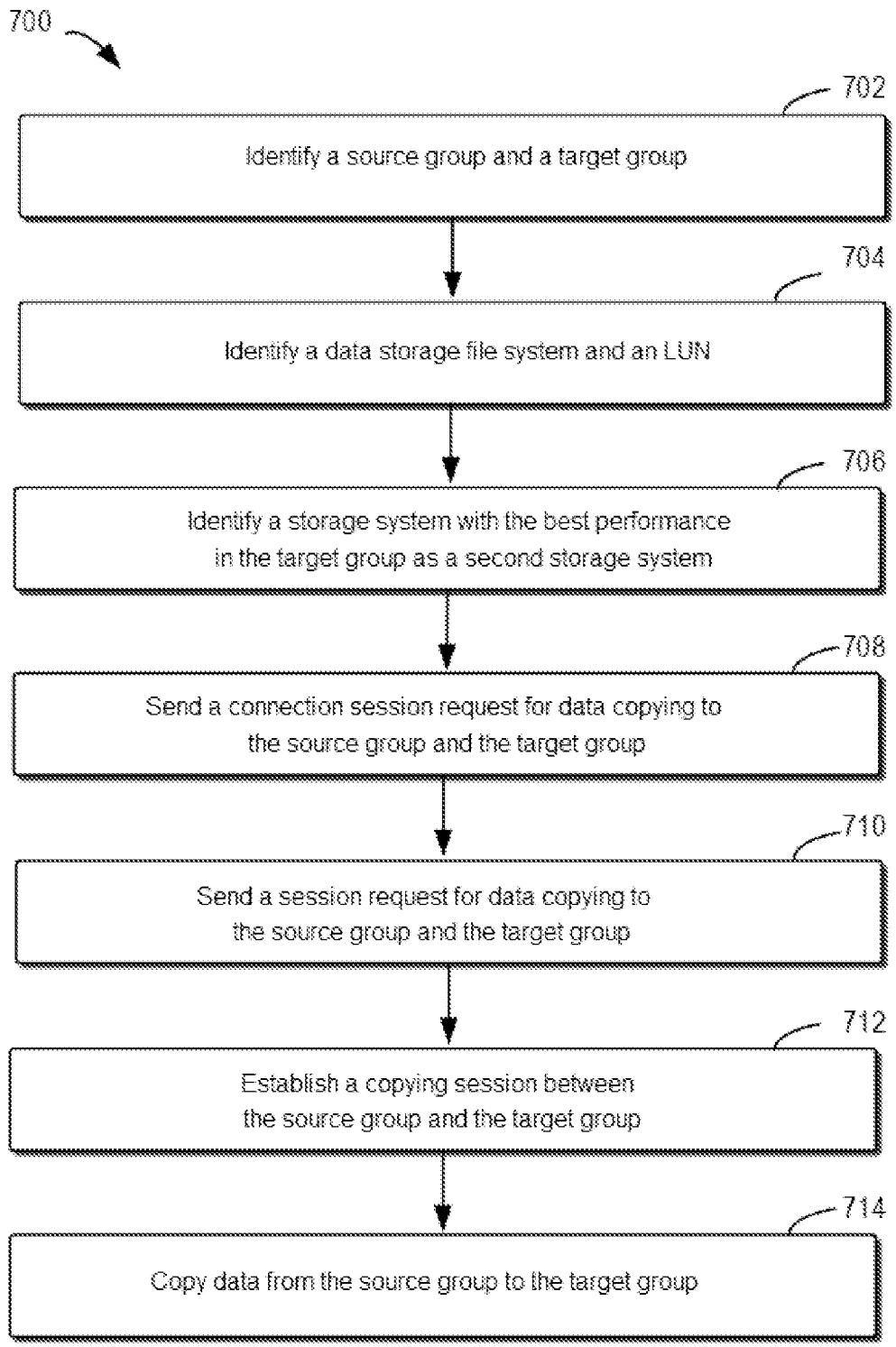
FIG. 7A schematically shows a schematic diagram of a workflow for inter-group copying according to an example implementation of the present disclosure.
Figure 7B:
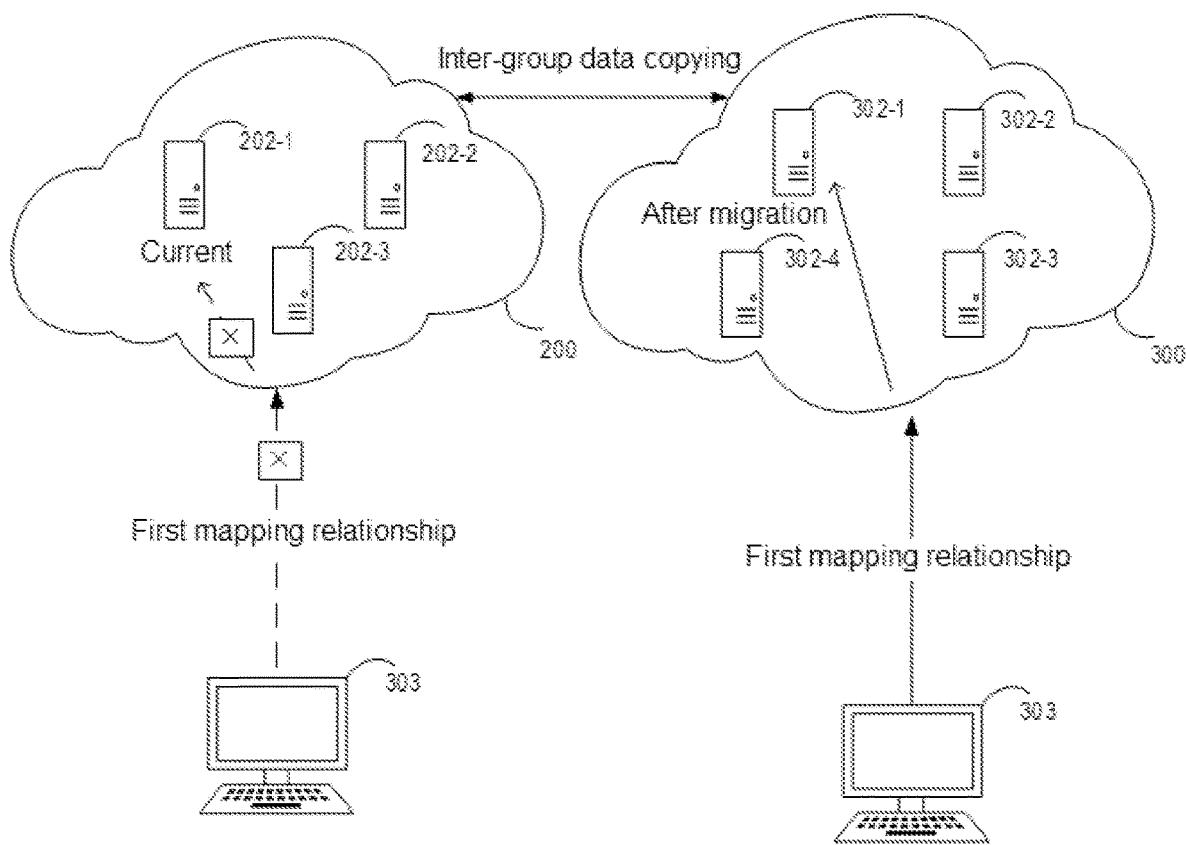
FIG. 7B schematically shows a block diagram of a device for inter-group copying according to an example implementation of the present disclosure.

FIG. 7A schematically shows a schematic diagram of workflow 700 for inter-group copying according to an example implementation of the present disclosure. FIG. 7B schematically shows a block diagram of a device for inter-group copying according to an example implementation of the present disclosure. How (inter-group) migration of data between a source group and a target group is implemented will be discussed in detail below in conjunction with FIG. 7A and FIG. 7B.

At block 702, a source group and a target group are identified by a user. As an example, source group 200 and target group 300 may be created by a user.

At block 704, the user identifies a data storage file system and a logic unit number (LUN). As an example, the data copying interface created at block 508 is taken as a file system, and the LUN may be the number of a storage device.

At block 706, a storage system with the best performance in the target group is identified by a data management application as a second storage system. As an example, data management application 102 may identify storage system 302-1 as a second storage system.

At block 708, a connection session request for data copying is sent by the data management application to the source group and the target group. As an example, data management application 102 uses the request for establishing a connection between the source group and the target group.

At block 710, a session request for data copying is sent by the data management application to the source group and the target group. As an example, data management application 102 may request to copy data from the source group to the target group after a connection session is successfully established.

At block 712, a copying session between the source group and the target group is established by the data management application. In this way, data may be transmitted in the established copying session.

At block 714, the data is copied from the source group to the target group. As an example, the data may be copied from source group 200 to target group 300.

Through workflow 700, data can be securely copied from storage systems in the source group to storage systems in the target group, thereby implementing data migration. Meanwhile, the security is improved due to the scattered storage of data. It will be appreciated that the scattered storage may include two aspects. In one aspect, data may be stored in the source group and the target group. In the other aspect, data may be stored in different storage systems in the source group or in different storage systems in the target group.

Figure 8:
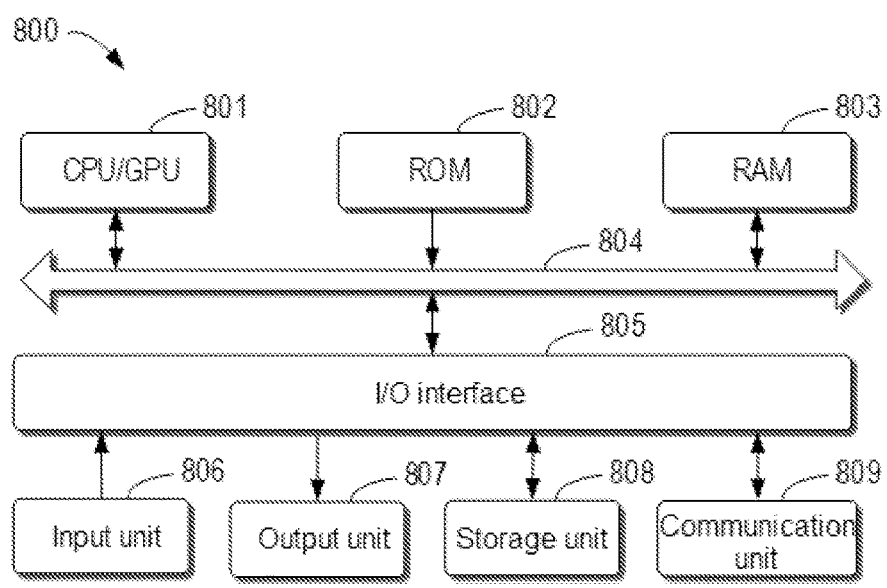
FIG. 8 schematically shows a block diagram of a device for data processing according to an example implementation of the present disclosure.

FIG. 8 shows a schematic block diagram of device 800 that may be configured to implement embodiments of the present disclosure. Device 800 may be the device or apparatus described in the embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus

804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by processing unit 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed in parallel substantially, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for data processing is provided. The method includes creating a source group including a first storage system and a target group including a plurality of storage systems. The method also includes selecting a second storage system from the plurality of storage systems in the target group based on the performance of the plurality of storage systems in the target group. The method further includes copying data in the first storage system to the second storage system.

In some embodiments, copying data in the first storage system to the second storage system further includes: selecting, in response to that the performance of the second storage system declines to not satisfy target performance and based on the performance of other storage systems in the target group, a third storage system from the other storage systems in the target group; and copying data in the first storage system to the third storage system.

In some embodiments, the method further includes: sending, after the data is copied from the first storage system to the third storage system, to a user a notification of a failure of the second storage system.

In some embodiments, creating a source group including a first storage system and a target group including a plurality of storage systems includes: creating a first mapping relationship between the first storage system and the source group; creating a second mapping relationship between the plurality of storage systems and the target group; and managing the copying of the data between the source group and the target group by using the first mapping relationship and the second mapping relationship.

In some embodiments, the method further includes: identifying, in response to detecting a failure of the first storage system, differential data between data stored in the first storage system and in the second storage system; copying the identified differential data to the second storage system; and determining the second storage system as a storage system in the source group.

In some embodiments, the first mapping relationship indicates parameters of a first virtual pool, a first virtual address set, and a virtual file system enabling the source group as a whole to respond to an external access; and the second mapping relationship indicates parameters of a second virtual pool and a second virtual address set enabling the target group as a whole to respond to an external access.

In some embodiments, the first virtual pool includes a first storage device set included by the source group, the first virtual address set includes a plurality of virtual addresses capable of accessing the first storage device set, and the virtual file system includes a user-operable virtual interface; and the second virtual pool includes a second storage device set included by the target group, and the second virtual address set includes a plurality of virtual addresses capable of accessing the second storage device set.

In a second aspect of the present disclosure, an electronic device is provided. The electronic device includes a processor and a memory coupled to the processor. The memory has instructions stored therein which, when executed by the processor, cause the device to perform actions. The actions include creating a source group including a first storage system and a target group including a plurality of storage systems. The actions also include selecting a second storage system from the plurality of storage systems in the target group based on the performance of the plurality of storage systems in the target group. The actions further include copying data in the first storage system to the second storage system.

In some embodiments, copying data in the first storage system to the second storage system further includes: selecting, in response to that the performance of the second storage system declines to not satisfy target performance and based on the performance of other storage systems in the target group, a third storage system from the other storage systems in the target group; and copying data in the first storage system to the third storage system.

In some embodiments, the actions further include: sending, after the data is copied from the first storage system to the third storage system, to a user a notification of a failure of the second storage system.

In some embodiments, creating a source group including a first storage system and a target group including a plurality of storage systems includes: creating a first mapping relationship between the first storage system and the source group; creating a second mapping relationship between the plurality of storage systems and the target group; and managing the copying of the data between the source group and the target group by using the first mapping relationship and the second mapping relationship.

In some embodiments, the actions further include: identifying, in response to detecting a failure of the first storage system, differential data between data stored in the first storage system and in the second storage system; copying the identified differential data to the second storage system; and determining the second storage system as a storage system in the source group.

In some embodiments, the first mapping relationship indicates parameters of a first virtual pool, a first virtual address set, and a virtual file system enabling the source group as a whole to respond to an external access; and the second mapping relationship indicates parameters of a second virtual pool and a second virtual address set enabling the target group as a whole to respond to an external access.

In some embodiments, the first virtual pool includes a first storage device set included by the source group, the first virtual address set includes a plurality of virtual addresses capable of accessing the first storage device set, and the virtual file system includes a user-operable virtual interface; and the second virtual pool includes a second storage device set included by the target group, and the second virtual address set includes a plurality of virtual addresses capable of accessing the second storage device set.

In an embodiment of the third aspect, a computer program product is provided. The computer program product is tangibly stored on a computer-readable medium and includes computer-executable instructions that, when executed by a device, cause the device to perform the method according to the first aspect.

Although the present disclosure has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for data processing, comprising:
creating a source group comprising a first storage system and a target group comprising a plurality of storage systems, including, when creating the source group, creating a virtual file system providing a user-operable virtual interface between users and data stored in the storage systems;
selecting a second storage system from the plurality of storage systems in the target group based on performance of the plurality of storage systems in the target group;
initiating copying of data in the first storage system to the second storage system, the data having a first portion of data and second portion of data;
subsequent to copying the first portion of data to the second storage system, and prior to copying the second portion of data to the second storage system, detecting that an access rate of the second storage system has declined below a target I/O access rate;
in response to detecting that the access rate of the second storage system has declined below the target I/O access rate:
selecting, based on performance of other storage systems in the target group, a third storage system having optimal performance in the target group,
copying the first portion of data from the second storage system to the third storage system,
copying the second portion of data from the first storage system to the third storage system, and
replacing the second storage system with the third storage system.

2. The method according to claim 1, wherein creating the source group comprising the first storage system and the target group comprising the plurality of storage systems comprises:
creating a first mapping relationship between the first storage system and the source group;
creating a second mapping relationship between the plurality of storage systems and the target group; and
managing the copying of the data by using the first mapping relationship and the second mapping relationship.

3. The method according to claim 2, further comprising:
identifying, in response to detecting a failure of the first storage system, differential data between data stored in the first storage system and in the second storage system;
copying the identified differential data to the second storage system; and determining the second storage system as a storage system in the source group.

4. The method according to claim 2, wherein
the first mapping relationship indicates parameters of a first virtual pool, a first virtual address set, and the virtual file system that enable the source group as a whole to respond to an external access; and
the second mapping relationship indicates parameters of a second virtual pool and a second virtual address set that enable the target group as a whole to respond to an external access.

5. The method according to claim 4, wherein
the first virtual pool comprises a first storage device set comprised by the source group, and the first virtual address set comprises a plurality of virtual addresses capable of accessing the first storage device set; and
the second virtual pool comprises a second storage device set comprised by the target group, and the second virtual address set comprises a plurality of virtual addresses capable of accessing the second storage device set.

6. An electronic device, comprising:
a processor; and
a memory coupled to the processor, wherein the memory has instructions stored therein which, when executed by the processor, cause the device to execute actions comprising:
creating a source group comprising a first storage system and a target group comprising a plurality of storage systems, including, when creating the source group, creating a virtual file system providing a user-operable virtual interface between users and data stored in the storage systems;
selecting a second storage system from the plurality of storage systems in the target group based on performance of the plurality of storage systems in the target group;
initiating copying of data in the first storage system to the second storage system, the data having a first portion of data and second portion of data;
subsequent to copying the first portion of data to the second storage system, and prior to copying the second portion of data to the second storage system, detecting that an access rate of the second storage system has declined below a target I/O access rate;
in response to detecting that the access rate of the second storage system has declined below the target I/O access rate:
selecting, based on performance of other storage systems in the target group, a third storage system having optimal performance in the target group,
copying the first portion of data from the second storage system to the third storage system,
copying the second portion of data from the first storage system to the third storage system, and
replacing the second storage system with the third storage system, and.

7. The electronic device according to claim 6, wherein creating the source group comprising the first storage system and the target group comprising the plurality of storage systems comprises:
creating a first mapping relationship between the first storage system and the source group;
creating a second mapping relationship between the plurality of storage systems and the target group; and managing the copying of the data by using the first mapping relationship and the second mapping relationship.

8. The electronic device according to claim 7, wherein the actions further comprise:
identifying, in response to detecting a failure of the first storage system, differential data between data stored in the first storage system and in the second storage system;
copying the identified differential data to the second storage system; and
determining the second storage system as a storage system in the source group.

9. The electronic device according to claim 7, wherein
the first mapping relationship indicates parameters of a first virtual pool, a first virtual address set, and the virtual file system that enable the source group as a whole to respond to an external access; and
the second mapping relationship indicates parameters of a second virtual pool and a second virtual address set that enable the target group as a whole to respond to an external access.

10. The electronic device according to claim 9, wherein
the first virtual pool comprises a first storage device set comprised by the source group, and the first virtual address set comprises a plurality of virtual addresses capable of accessing the first storage device set; and
the second virtual pool comprises a second storage device set comprised by the target group, and the second virtual address set comprises a plurality of virtual addresses capable of accessing the second storage device set.

11. A computer program product having a non-transitory computer readable medium which stores a set of instructions to perform data processing; the set of instructions, when carried out by computerized circuitry, causing the computerized circuitry to perform a method of:
creating a source group comprising a first storage system and a target group comprising a plurality of storage systems, including, when creating the source group, creating a virtual file system providing a user-operable virtual interface between users and data stored in the storage systems;
selecting a second storage system from the plurality of storage systems in the target group based on performance of the plurality of storage systems in the target group;
initiating copying of data in the first storage system to the second storage system, the data having a first portion of data and second portion of data;
subsequent to copying the first portion of data to the second storage system, and prior to copying the second portion of data to the second storage system, detecting that an access rate of the second storage system has declined below a target I/O access rate;
in response to detecting that the access rate of the second storage system has declined below the target I/O access rate:
selecting, based on performance of other storage systems in the target group, a third storage system having optimal performance in the target group,
copying the first portion of data from the second storage system to the third storage system,
copying the second portion of data from the first storage system to the third storage system, and
replacing the second storage system with the third storage system.

* * * * *